United States Patent
Lu et al.

(10) Patent No.: US 8,305,460 B2
(45) Date of Patent: Nov. 6, 2012

(54) DETECTION DEVICE AND IMAGE CAPTURE SYSTEM USING THE SAME

(75) Inventors: Chih Hung Lu, Hsinchu (TW);
En-Feng Hsu, Hsinchu (TW);
Hsin-Chia Chen, Hsinchu (TW);
Chao-Chien Huang, Hsinchu (TW);
Cho-Yi Lin, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 17 days.

(21) Appl. No.: 12/880,790

(22) Filed: Sep. 13, 2010

(65) Prior Publication Data
US 2011/0317040 A1 Dec. 29, 2011

(30) Foreign Application Priority Data
Jun. 25, 2010 (TW) .............................. 99120908 A (51) Int. Cl.
*H04N 5/228* (2006.01)
(52) U.S. Cl. ..................................... 348/222.1; 348/239
(58) Field of Classification Search ............... 348/222.1, 348/240.1, 240.2, 240.3, 240.99, 254, 255
See application file for complete search history.

(56) References Cited

U.S. PATENT DOCUMENTS

| | | | |
|---|---|---|---|
| 7,358,988 B1 * | 4/2008 | Konishi et al. | 348/222.1 |
| 7,508,422 B2 * | 3/2009 | Kamon et al. | 348/229.1 |
| 2003/0016289 A1 * | 1/2003 | Motomura | 348/211.5 |
| 2005/0190272 A1 * | 9/2005 | Takahashi et al. | 348/222.1 |
| 2005/0270387 A1 * | 12/2005 | Watanabe et al. | 348/240.99 |
| 2006/0038895 A1 * | 2/2006 | Suzuki et al. | 348/222.1 |
| 2006/0125932 A1 * | 6/2006 | Lu et al. | 348/222.1 |
| 2006/0253866 A1 * | 11/2006 | Curcio et al. | 725/40 |
| 2007/0165251 A1 * | 7/2007 | Byun et al. | 358/1.9 |
| 2009/0001165 A1 * | 1/2009 | Zhang et al. | 235/462.11 |
| 2010/0157105 A1 * | 6/2010 | Yokohata | 348/240.3 |

* cited by examiner

*Primary Examiner* — Tuan Ho
(74) *Attorney, Agent, or Firm* — Morris Manning & Martin LLP; Tim Tingkang Xia, Esq.

(57) ABSTRACT

A detection device includes an image capture element, a control signal generator, and a processor. The image capture element is used for capturing an optical signal, and outputting an image signal. The control signal generator is used for generating a control signal. The processor selectively converts the image signal into an object feature or an image feature in response to the control signal. Such a detection device can appropriately convert an operation mode, so as to have both efficacies of reducing the amount of transferred data and processing complex image data.

19 Claims, 7 Drawing Sheets

DETECTION DEVICE AND IMAGE CAPTURE SYSTEM USING THE SAME

CROSS-REFERENCE TO RELATED APPLICATIONS

This non-provisional application claims priority under 35 U.S.C. §119(a) on Patent Application No(s). 099120908 filed in Taiwan, R.O.C. on Jun. 25, 2010, the entire contents of which are hereby incorporated by reference.

BACKGROUND OF THE INVENTION

1. Field of Invention

The present invention relates to a detection device, and more particularly to a detection device capable of switching mode automatically.

2. Related Art

With continuous evolution of the image processing technology, an image capture element has been applied in various devices. For example, the image capture element may be applied in a digital camera, a digital video camera, and the like, so as to capture an image and store the image in a digital manner.

In addition, the image capture element can also be a detection device in an interactive system. The interactive system can perform image recognition according to an image captured by the image capture element, so as to detect a behavior of a user. Therefore, the interactive system can use the behavior of the user as an input signal based on the result of image recognition, so that the user can control the interactive system.

The image capture element can also capture a dynamic image data. That is to say, the image capture element captures an image signal at intervals of a sampling time. The image signals are arranged in a time sequence, so as to obtain a dynamic image signal.

Since the dynamic image signal corresponds to a huge amount of image data, to transfer the image data, not only large transmission bandwidth but also high power consumption are required. Therefore, a data compression technique is proposed in the conventional art. This technique captures some feature values from the image data, and only transfers these feature values. Upon receiving these feature values, a receiving end may perform image restoration according to the feature values, and capture specific information.

However, the conventional art is only applicable to images with simple picture information. Images with complex picture information, for example, images of two-dimensional bar codes, cannot be restored through the feature values.

SUMMARY OF THE INVENTION

In view of the above problem, the present invention is a detection device, so as to have the functions of small data transmission amount and complex image detection at the same time.

The present invention provides a detection device, which comprises an image capture element, a control signal generator, and a processor.

The image capture element is used for capturing an optical signal, and outputting an image signal. The control signal generator is used for generating a control signal. The processor selectively converts the image signal into an object feature or an image feature in response to the control signal.

The object feature is a parameter of an image object in the image signal. The parameter is a coordinate value of the image object, an area value of the image object, an aspect ratio of the image object, a direction value of the image object, a color value of the image object, or an object vertex number of the image object, or a combination of the above parameters.

The image feature is gray-scale image data, binary image data subjected to image enhancement processing, or other two-dimensional image data.

The present invention further provides a detection device, which comprises a lens, an image capture element, a control signal generator, a processor, and a signal transfer element.

The lens is used for allowing an optical signal to pass through. The image capture element is used for capturing the optical signal and outputting an image signal. The control signal generator is used for generating a control signal. The processor selectively converts the image signal into an object feature or an image feature in response to the control signal. The signal transfer element is used for transferring the object feature or the image feature.

The detection device provided in the present invention can selectively perform conversion into an object feature or an image feature according to a control signal. Therefore, such a detection device can appropriately convert an operation mode, so as to have both efficacies of reducing the amount of transferred data and processing complex image data.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in further detail through the following embodiments, and the content of the detailed description is sufficient for those skilled in the art to understand the technical content of the present invention and to implement the present invention accordingly. Based upon the content of the specification, the claims, and the drawings, those skilled in the art can easily understand the relevant objectives and advantages of the present invention.

Figure 1:
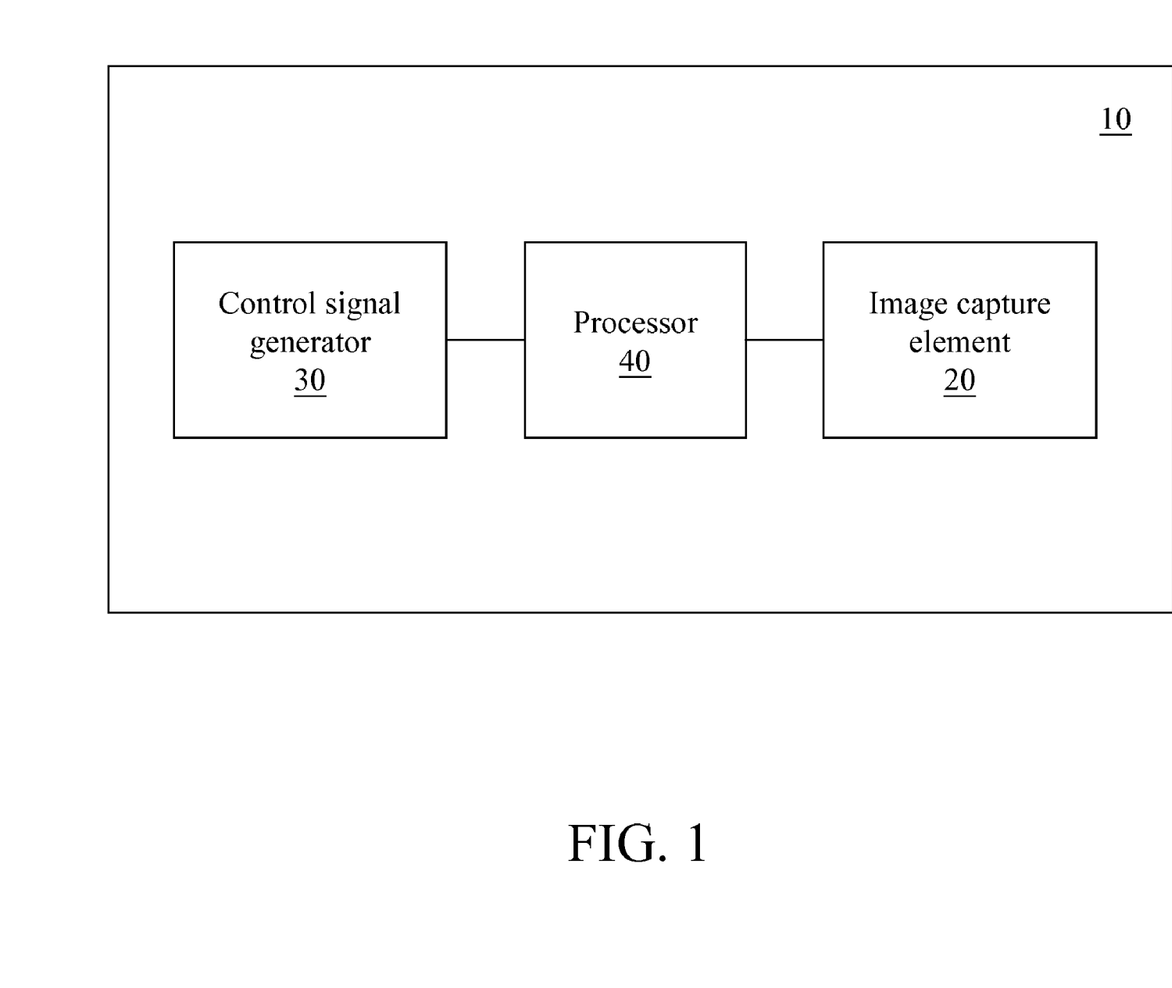
FIG. 1 is a block architectural diagram of a first embodiment of the present invention.

FIG. 1 is a block architectural diagram of a first embodiment of the present invention. A detection device 10 comprises an image capture element 20, a control signal generator 30, and a processor 40.

The image capture element 20 is used for capturing an optical signal and outputting an image signal. The image capture element 20 is a complementary metal-oxide-semiconductor (CMOS) or a charge coupled device (CCD).

The control signal generator 30 is used for generating a control signal. The control signal can be used for changing an operation mode of the detection device 10.

The processor 40 is electrically connected to the image capture element 20 and the control signal generator 30. The processor 40 processes the image signal output from the image capture element 20 according to the control signal generated by the control signal generator 30. When the control signal represents a first state, the processor 40 converts the image signal into an object feature. When the control signal represents a second state, the processor 40 converts the image signal into an image feature. The processor 40 may be a microprocessor or a microcontroller.

The object feature is at least one parameter of an image object in the image signal. Such an image object may be a pattern having a specific geometric shape, such as, a circle, a rectangle, and a polygon. The parameter is one of a vertex coordinate value or a center coordinate value of the image object, an area value of the image object, a side aspect ratio of the image object, a radius of the image object, a direction value of the image object, a color value of the image object, and an object vertex number of the image object, or a combination of the above parameters. For example, when the image capture element 20 detects a point light source and computes a moving distance, only an object feature, for example, a coordinate of a center of the light source needs to be captured, so as to calculate the distance of the movement of the image capture element 20.

The image feature is image data of a two-dimensional array, for example, gray-scale image data or binary image data subjected to image enhancement processing. Complex processing may be performed on the image feature. For example, when the image capture element 20 captures a two-dimensional bar code, an image corresponding to the two-dimensional bar code may be converted into binary image data or gray-scale image data, so that the two-dimensional bar code can be successfully recognized.

Such a detection device 10 can selectively convert the image data into an object feature or an image feature according to different situations, so as to have both efficacies of reducing the amount of transferred data and processing complex image data.

Figure 2:
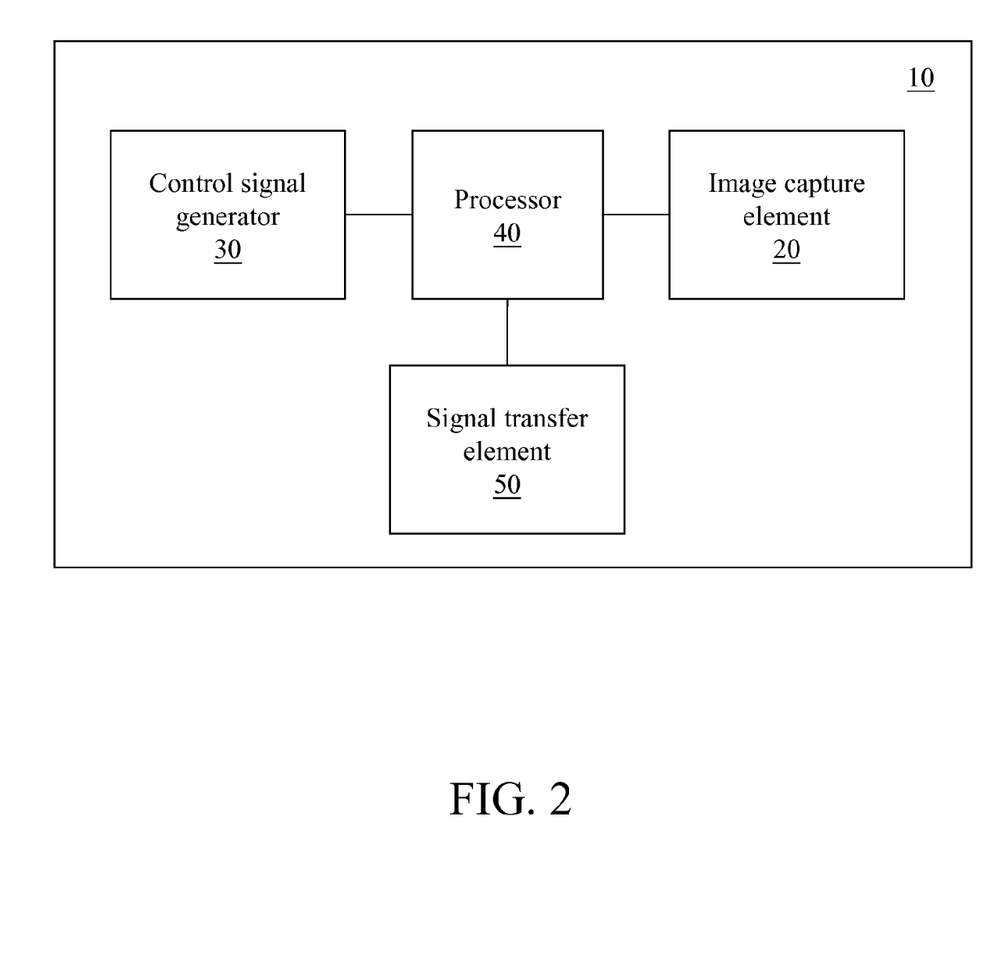
FIG. 2 is a block architectural diagram of a second embodiment of the present invention.

FIG. 2 is a block architectural diagram of a second embodiment of the present invention. A detection device 10 comprises an image capture element 20, a control signal generator 30, a processor 40, and a signal transfer element 50.

The signal transfer element 50 can be used for transferring an object feature or an image feature to a computer host or another system having a computing function. After receiving the object feature or the image feature, the computer host or the system having the computing function can further process the object feature or the image feature. The signal transfer element 50 may be a wired or wireless transfer element, for example, a transfer element compatible with the Bluetooth transport specification. In this system, the image capture element 20, the processor 40, and the signal transfer element 50 are located on the same chip.

Figure 3:
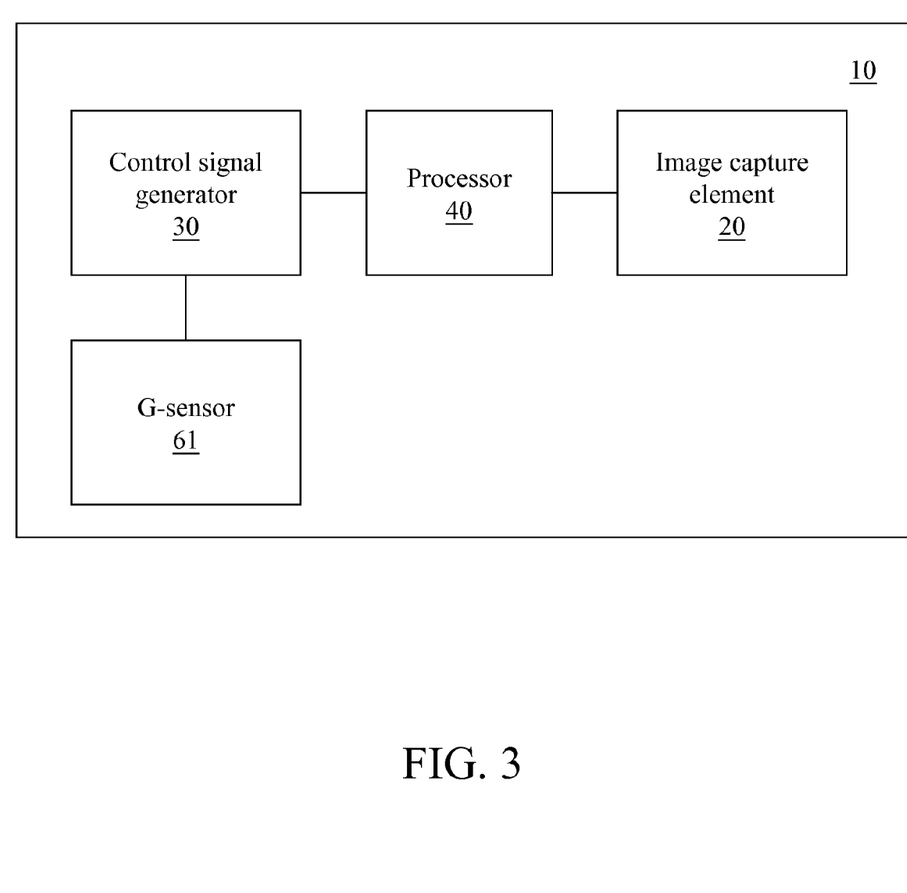
FIG. 3 is a block architectural diagram of a third embodiment of the present invention.

FIG. 3 is a block architectural diagram of a third embodiment of the present invention. A detection device 10 comprises an image capture element 20, a control signal generator 30, a processor 40, and a gravity sensor (G-sensor) 61.

The G-sensor 61 is electrically connected to the control signal generator 30. The G-sensor 61 further comprises a linear accelerometer and gyroscopes, and can provide speed and displacement information. The sensing method of the G-sensor 61 is to measure some subtle variations of physical quantities, such as, resistance value, capacitance value, stress, deformation, and displacement, and then represent the variations with voltage signals, so as to obtain speed and displacement information after conversion based on formulas. The G-sensor 61 can be used for sensing how a user operates the detection device 10, and controlling the control signal generator 30 to generate a control signal representing a first state or a second state according to the behavior of the user. The processor 40 converts an image signal into an object feature or an image feature according to the control signal.

For example, when the user needs to control the detection device 10 to read a two-dimensional bar code, the user usually aligns the detection device 10 with the two-dimensional bar code, that is, turns the detection device 10 downwards. At this time, the G-sensor 61 can detect a physical quantity variation, and transfer the message to the control signal generator 30, and the control signal generator 30 generates a control signal, so that the processor 40 converts the image signal into an image feature. When the user normally operates the detection device 10, for example, keeps the detection device 10 horizontal, the G-sensor 61 can transfer the message to the control signal generator 30, and the control signal generator 30 generates a control signal, so that the processor 40 converts the image signal into an object feature.

Figure 4:
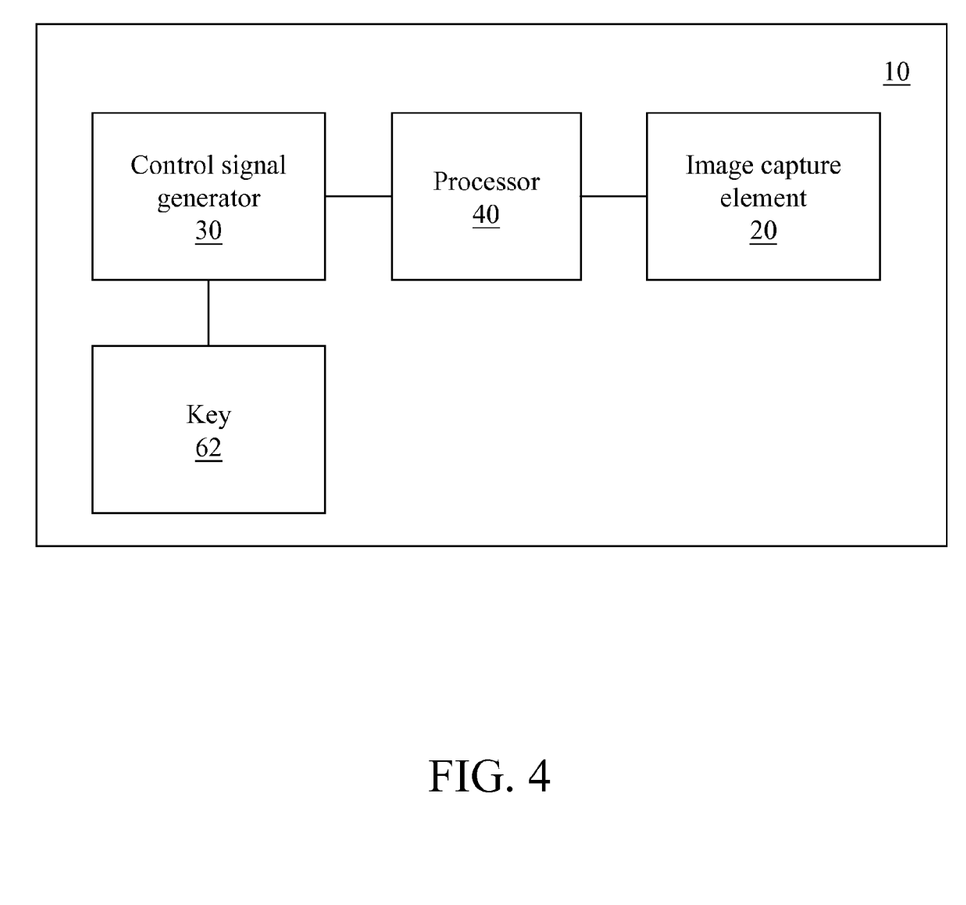
FIG. 4 is a block architectural diagram of a fourth embodiment of the present invention.

FIG. 4 is a block architectural diagram of a fourth embodiment of the present invention. A detection device 10 comprises an image capture element 20, a control signal generator 30, a processor 40, and a key 62.

The key 62 is electrically connected to the control signal generator 30. The user can control the control signal generator 30 through the key 62 to generate a control signal representing a first state or a second state. The processor 40 converts an image signal into an object feature or an image feature according to the control signal. For example, when the key 62 is pressed, the processor 40 converts an image signal into an object feature; when the key 62 is not pressed, the processor 40 converts the image signal into an image feature.

Figure 5:
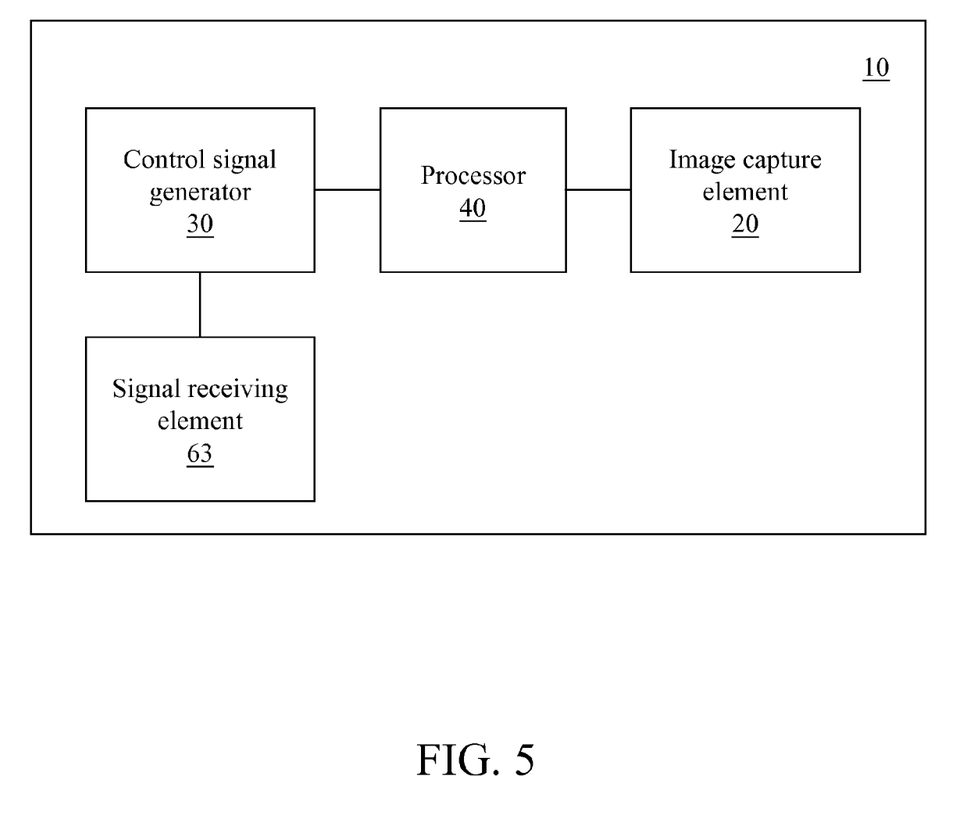
FIG. 5 is a block architectural diagram of a fifth embodiment of the present invention.

FIG. 5 is a block architectural diagram of a fifth embodiment of the present invention. A detection device 10 comprises an image capture element 20, a control signal generator 30, a processor 40, and a signal receiving element 63.

The signal receiving element 63 is electrically connected to the control signal generator 30. The signal receiving element 63 can be used for receiving a selection signal transferred from a computer host or another system having a computing function. The control signal generator 30 generates a control signal representing a first state or a second state according to the selection signal. Therefore, the computer host or the system having the computing function can control the processor 40 to convert an image signal into an image feature or an object feature according to computational requirements. The signal receiving element 63 is a wired or wireless receiving element, for example, a receiving element compatible with the Bluetooth transport specification.

Figure 6:
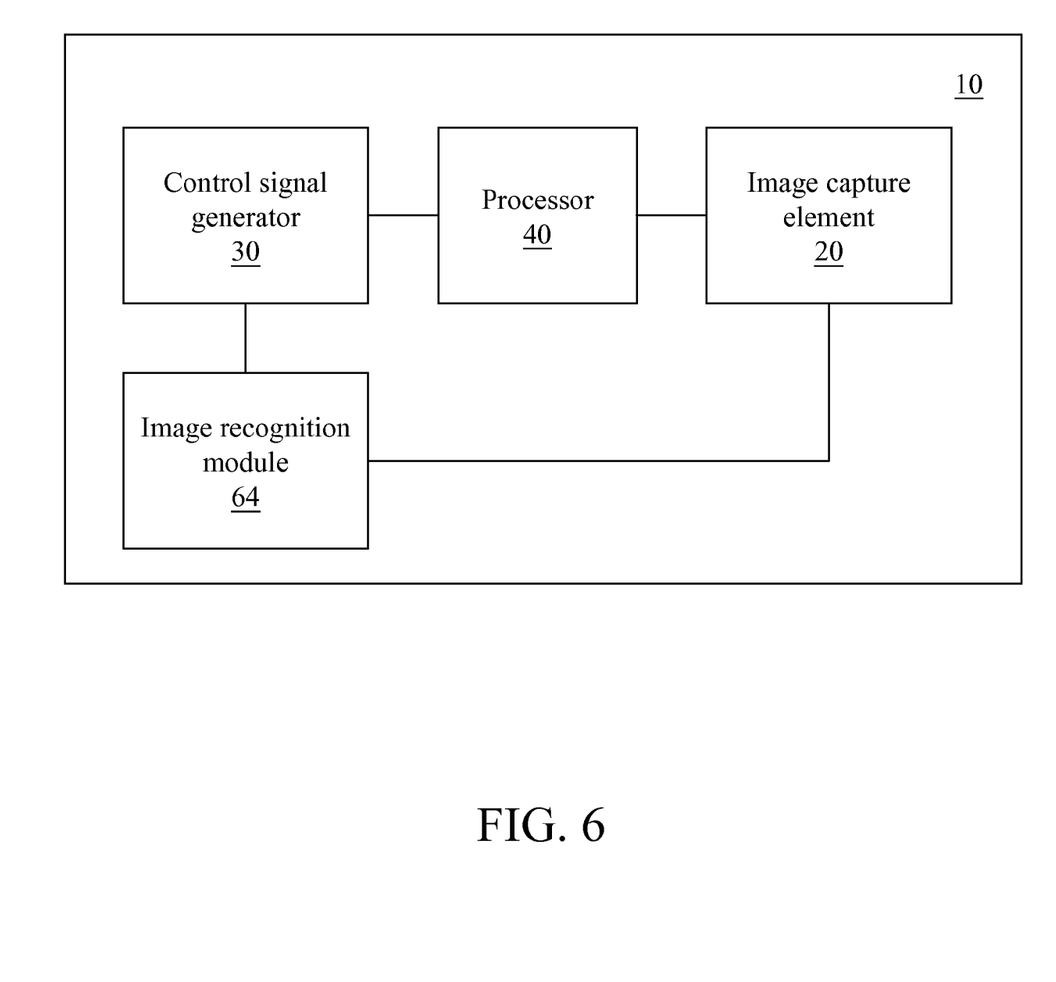
FIG. 6 is a block architectural diagram of a sixth embodiment of the present invention.

FIG. 6 is a block architectural diagram of a sixth embodiment of the present invention. A detection device 10 comprises an image capture element 20, a control signal generator 30, a processor 40, and an image recognition module 64.

The image recognition module 64 is electrically connected to the image capture element 20 and the control signal generator 30. The image recognition module 64 is used for recognizing an image signal captured by the image capture element 20 and outputting a recognition result to the control signal generator 30. The control signal generator 30 generates a control signal according to the recognition result. More particularly, the image recognition module 64 can calculate entropy of the image signal, and a control signal is generated according to the entropy. The processor 40 converts the image signal into an object feature or an image feature according to the control signal.

Generally speaking, an image signal with higher entropy represents a complex image, and thus needs to be converted into an image feature, while an image signal with lower entropy represents a simple image, and thus needs to be converted into an object feature.

Figure 7:
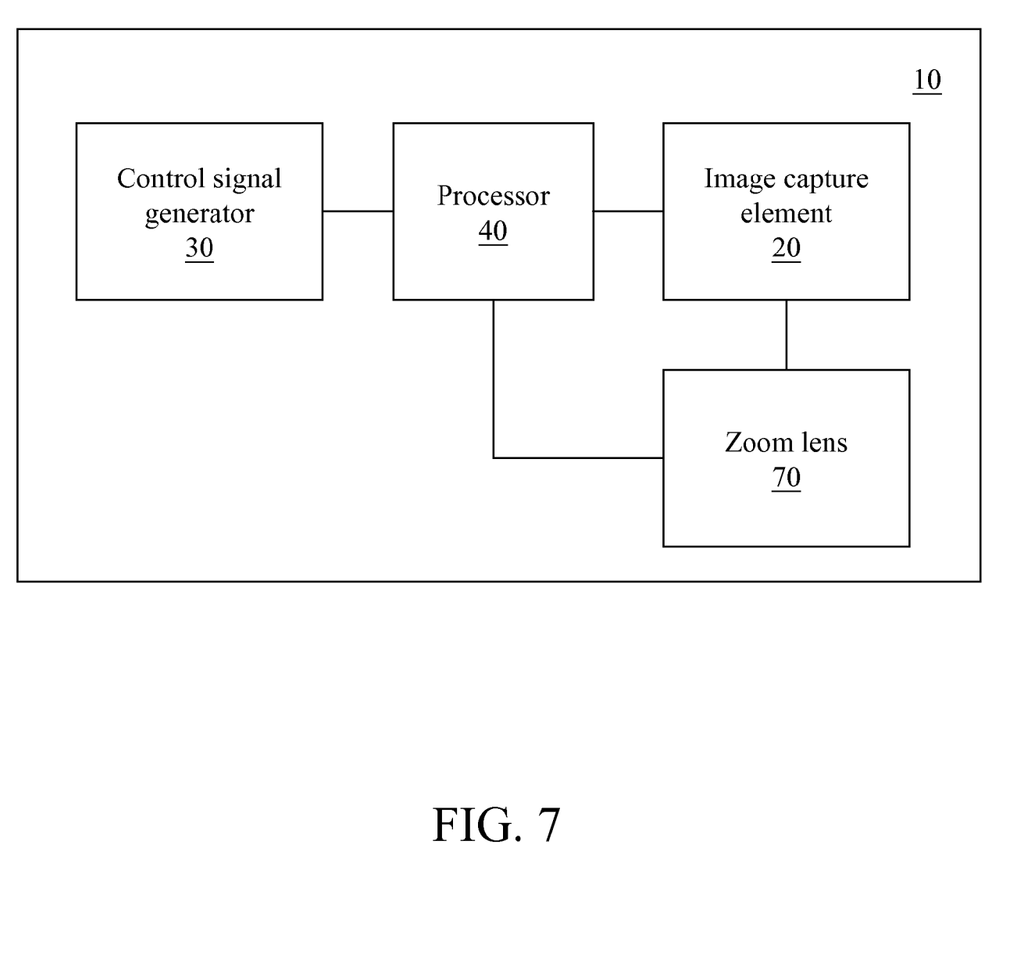
FIG. 7 is a block architectural diagram of a seventh embodiment of the present invention.

FIG. 7 is a block architectural diagram of a seventh embodiment of the present invention. A detection device 10 comprises an image capture element 20, a control signal generator 30, a processor 40, and a zoom lens 70.

The zoom lens 70 is optically connected to the image capture element 20. An optical signal passes through the zoom lens 70, and is then captured by the image capture element 20. When converting an image signal into an image feature, the processor 40 automatically adjusts a focal length of the zoom lens 70 so that the image signal is clearer.

In this embodiment, the zoom lens 70 is configured with an infrared filter. The zoom lens 70 can be used for capturing an infrared signal.

Based on the above, the detection device provided in the present invention can automatically determine whether to selectively convert the image data into an object feature or an image feature according to the operation mode of the user, whether the button is pressed, and the complexity of the signal or image provided by the computer host. Therefore, such a detection device can appropriately convert the operation mode, so as to have both efficacies of reducing the amount of transferred data and processing complex image data.

What is claimed is:

1. A detection device, comprising:
    an image capture element, for capturing an optical signal, and outputting an image signal;
    a control signal generator, for generating a control signal; and
    a processor, for selectively converting the image signal into an object feature or an image feature in response to the control signal, wherein the object feature is at least one parameter of at least one image object that is a pattern having a geometric shape in the image signal, and wherein the parameter is one of or a combination of more than one of a coordinate value of the image object, an area value of the image object, an aspect ratio of the image object, a direction value of the image object, a color value of the image object, and an object vertex number of the image object.

2. The detection device according to claim 1, wherein the image feature is a gray-scale image data.

3. The detection device according to claim 1, wherein the image feature is a binary image data.

4. The detection device according to claim 1, further comprising a signal transfer element, for transferring the object feature or the image feature.

5. The detection device according to claim 4, wherein the signal transfer element is compatible with a Bluetooth transport specification.

6. The detection device according to claim 1, further comprising a gravity sensor (G-sensor), wherein the G-sensor is electrically connected to the control signal generator, and the control signal generator generates the control signal according to a sensing result of the G-sensor.

7. The detection device according to claim 1, further comprising a key, wherein the key is electrically connected to the control signal generator, and the control signal generator generates the control signal according to a state of the key.

8. The detection device according to claim 1, further comprising a signal receiving element, for receiving a selection signal, wherein the signal receiving element is connected to the control signal generator, and the control signal generator generates the control signal according to the selection signal.

9. The detection device according to claim 1, further comprising an image recognition module, wherein the image recognition module is electrically connected to the control signal generator, and used for recognizing the image signal and outputting a recognition result to the control signal generator, and the control signal generator generates the control signal according to the recognition result.

10. The detection device according to claim 1, further comprising a zoom lens, wherein the optical signal passes through the zoom lens, and is then captured by the image capture element, and when the processor converts the image signal into the image feature, the processor automatically adjusts a focal length of the zoom lens.

11. The detection device according to claim 10, wherein the zoom lens is configured with an infrared filter.

12. An image capture system, comprising:
    a lens, for allowing an optical signal to pass through;
    an image capture element, for capturing the optical signal, and outputting an image signal;
    a control signal generator, for generating a control signal;
    a processor, for selectively converting the image signal into an object feature or an image feature in response to the control signal, and
    a signal transfer element, for transferring the object feature or the image feature,
    wherein the object feature is at least one parameter of at least one image object that is a pattern having a geometric shape in the image signal, and wherein the parameter is one of or a combination of more than one of a coordinate value of the image object, an area value of the image object, an aspect ratio of the image object, a direction value of the image object, a color value of the image object, and an object vertex number of the image object.

13. The image capture system according to claim 12, further comprising a gravity sensor (G-sensor), wherein the G-sensor is electrically connected to the control signal generator, and the control signal generator generates the control signal according to a sensing result of the G-sensor.

14. The image capture system according to claim 12, further comprising a key, wherein the key is electrically connected to the control signal generator, and the control signal generator generates the control signal according to a state of the key.

15. The image capture system according to claim 12, further comprising a signal receiving element, for receiving a selection signal, wherein the signal receiving element is connected to the control signal generator, and the control signal generator generates the control signal according to the selection signal.

16. The image capture system according to claim 12, further comprising an image recognition module, wherein the image recognition module is electrically connected to the control signal generator, and used for recognizing the image signal and outputting a recognition result to the control signal generator, and the control signal generator generates the control signal according to the recognition result.

17. The image capture system according to claim 12, wherein the image feature is a gray-scale image data or a binary image data.

18. The image capture system according to claim 12, wherein the lens is a zoom lens, and when the control signal is in a second mode, the processor automatically adjusts a focal length of the zoom lens.

19. The image capture system according to claim 12, wherein the image capture element, the processor, and the signal transfer element are located on the same chip.

* * * * *